US010392710B2

(12) United States Patent
Gasparetto et al.

(10) Patent No.: US 10,392,710 B2
(45) Date of Patent: Aug. 27, 2019

(54) BRIGHTENING AND PASSIVATION OF STAINLESS STEEL SURFACES

(71) Applicant: Henkel AG & Co. KGaA, Duesseldorf (DE)

(72) Inventors: Valentino Gasparetto, Olgiate Molgora (IT); Mauro Rigamonti, Opera (IT); Paolo Giordani, Crema (IT); Stefano Sfolcini, Casalpusterlengo (IT)

(73) Assignee: Henkel AG & Co. KGaA, Duesseldorf (DE)

( * ) Notice: Subject to any disclaimer, the term of this patent is extended or adjusted under 35 U.S.C. 154(b) by 329 days.

(21) Appl. No.: 14/729,431

(22) Filed: Jun. 3, 2015

(65) Prior Publication Data

US 2015/0267307 A1 Sep. 24, 2015

Related U.S. Application Data

(63) Continuation of application No. PCT/EP2013/076257, filed on Dec. 11, 2013.

(30) Foreign Application Priority Data

Dec. 11, 2012 (GB) .................................. 1222282.4

(51) Int. Cl.

| | |
|---|---|
| ***C23C 22/34*** | (2006.01) |
| ***C23F 3/03*** | (2006.01) |
| ***C09G 1/04*** | (2006.01) |
| ***C23F 3/06*** | (2006.01) |
| ***C23G 1/08*** | (2006.01) |
| ***C23F 1/28*** | (2006.01) |
| *C23C 22/00* | (2006.01) |

(52) U.S. Cl.

CPC .................. *C23F 3/03* (2013.01); *C09G 1/04* (2013.01); *C23C 22/34* (2013.01); *C23F 1/28* (2013.01); *C23F 3/06* (2013.01); *C23G 1/086* (2013.01)

(58) Field of Classification Search

USPC .................................................. 148/240–287

See application file for complete search history.

(56) References Cited

U.S. PATENT DOCUMENTS

| | | | | |
|---|---|---|---|---|
| 5,538,152 | A | 7/1996 | Fontana | |
| 6,153,723 | A | 11/2000 | Lang et al. | |
| 2003/0121568 | A1 | 7/2003 | Giordani et al. | |
| 2008/0063896 | A1 | 3/2008 | Fujibayashi et al. | |
| 2009/0266450 | A1* | 10/2009 | McCormick | C23C 22/36 148/255 |
| 2013/0115470 | A1 | 5/2013 | Schade et al. | |
| 2016/0272818 | A1* | 9/2016 | Morris | C23C 22/68 |

FOREIGN PATENT DOCUMENTS

| | | | |
|---|---|---|---|
| CN | 1239107 | A | 12/1999 |
| CN | 101326274 | A | 12/2008 |
| DE | 4241134 | A2 | 6/1994 |
| EP | 0505606 | A1 | 9/1992 |
| EP | 0582121 | A1 | 2/1994 |
| EP | 0945527 | A1 | 9/1999 |
| EP | 1552035 | B1 | 8/2010 |
| FR | 2634498 | A1 | 1/1990 |
| JP | 08253880 | A | 10/1996 |
| JP | 09217184 | A | 8/1997 |
| JP | 2005036288 | A | 2/2005 |
| JP | 2006009121 | A | 1/2006 |
| JP | 2006503182 | A | 1/2006 |
| JP | 2010509499 | A | 3/2010 |
| WO | 0149899 | A2 | 7/2001 |

OTHER PUBLICATIONS

International Search Report for PCT/EP2013/076257, dated Mar. 27, 2014, 3 pages. All references cited in the International Search Report are listed herein.

* cited by examiner

*Primary Examiner* — Lois L Zheng
(74) *Attorney, Agent, or Firm* — Mary K. Cameron

(57) ABSTRACT

This invention relates to a composition for the brightening and/or passivating of stainless steel after pickling. The invention is based on the discovery that the presence of organic compounds containing multiple hydroxyl groups with at least 3, but not more than 8 carbon atoms as a further ingredient of passivating and brightening solution significantly increases the desmutting performance of pickled stainless steel surfaces. The compositions of the invention are especially useful for the passivating and brightening of stainless steel grades being alloyed with sulfur. The invention thus further encompasses a passivating and brightening process for pickled stainless steel surfaces wherein the stainless steel is alloyed with at least 0.10 at.-% of sulfur.

18 Claims, No Drawings

BRIGHTENING AND PASSIVATION OF STAINLESS STEEL SURFACES

This invention relates to a composition for the brightening and/or passivating of stainless steel after pickling. The invention is based on the discovery that the presence of organic compounds containing multiple hydroxyl groups with at least 3, but not more than 8 carbon atoms as a further ingredient of passivating and brightening solution significantly increases the desmutting performance of pickled stainless steel surfaces. The compositions of the invention are especially useful for the passivating and brightening of stainless steel grades being alloyed with sulfur. The invention thus further encompasses a passivating and brightening process for pickled stainless steel surfaces wherein the stainless steel is alloyed with at least 0.10 at.-% of sulfur.

In general, technical steels are termed "stainless" if rust formation is prevented under normal environmental conditions, for example in the presence of atmospheric oxygen and moisture and in aqueous solutions. Most high-alloy, so-called corrosion-resistant or acid-resistant steels withstand relatively severe corrosion conditions, for example acids and salt solutions. These steels are generically referred to as stainless steels. Stainless steels are iron based alloys containing at least 10 at.-% chromium. The formation of chromium oxide on the material surface imparts to the stainless steels the corrosion-resistant character thereof. Special steels may be sub-divided into the following families: austenitic steels, ferritic steels, martensitic steels, precipitation hardened steels and duplex steels. These groups differ in the physical and mechanical properties thereof, as well as in corrosion resistance, as a result of the various alloying constituents.

When stainless steel is annealed and hot rolled a layer of scale forms on the surface. Such a layer of scale impedes the desired shiny metallic appearance of the steel surface. This layer of scale must therefore be removed after this production step. This removal may be effected by a pickling process according to the state of the art. The oxide-containing surface layer to be removed differs fundamentally from the oxide layer on low-alloy steels or on carbon steels. Apart from iron oxides, the surface layer contains oxides of the alloying elements, for example chromium, nickel, aluminum, titanium or niobium. Particularly in hot rolling, there is an accumulation of chromium oxide in the surface layer. The oxide layer is accordingly enriched with chromium rather than iron. Conversely, this means that the steel layer immediately underneath the oxide layer is depleted in chromium. A pickling process using suitable acidic pickling solutions preferentially dissolves this chromium-depleted layer underneath the oxide layer, with the result that the oxide layer is removed.

Pickling processes for special steel are well-known in the art. Earlier processes use nitric acid-containing pickling baths. These often additionally contain hydrofluoric acid, which on account of its complexing action with respect to iron ions promotes the pickling process. Although such pickling baths are economically efficient and technically satisfactory, they have the serious ecological disadvantage that they emit considerable amounts of nitrogen oxides and release large amounts of nitrates into the waste water.

Intensive efforts have therefore been made in the art to find alternative pickling and passivating processes that do not use nitric acid. Ferric ions are a possible substitute for the oxidizing action of nitric acid. The concentration of ferric ions is maintained by hydrogen peroxide, which is added continuously or batch wise to the treatment baths. Such pickling or passivating baths contain about 15 to about 65 g/l of trivalent iron ions. During the pickling process, trivalent iron ions are converted to the divalent form. At the same time, further divalent iron ions are dissolved out from the pickled surface. The pickling bath is thereby depleted in trivalent iron ions during the operation, while divalent iron ions accumulate. The redox potential of the treatment solution is thereby displaced, with the result that the solution finally loses its pickling action. Divalent iron ions are oxidized back to the trivalent state by the continuous or batch wise addition of oxidizing agents, for example hydrogen peroxide, or other oxidizing agents, such as perborates, peracids or also organic peroxides. In this way, the redox potential necessary for the pickling or passivating action is maintained.

EP-B-505 606 describes a nitric acid-free process for the pickling and passivation of stainless steel, in which the material to be treated is immersed in a bath at a temperature of between 30 and 70° C. and which contains, at least at the beginning of the pickling process, at least 150 g/l of sulfuric acid, at least 15 g/l of Fe(III) ions, and at least 40 g/l HF. This bath furthermore contains up to about 1 g/l of additives, such as non-ionic surfactants and pickling inhibitors. Hydrogen peroxide is added continuously or batch wise to the bath in such amounts that the redox potential remains in the desired range. The other bath constituents are also replenished so that the concentration thereof remains within the optimum operating range. The pickling bath is agitated by blowing in air. Agitation of the pickling bath is necessary in order to achieve a uniform pickling result. A similar process, which differs from the above-described process basically only in the adjusted redox potential, is described in EP-A-582 121.

After the pickling, the surface is chemically activated, which means that, in air, the surface once again becomes coated with an optically interfering surface layer. This may be prevented by passivating the freshly pickled surfaces after or during the pickling. This may be performed in treatment solutions similar to the pickling solutions, a higher redox potential being used for the passivation than for the pickling process. This special passivation step forms an optically invisible passivation layer on the metal surface, and the steel surface thereby preserves its shiny metallic appearance. Whether a treatment solution behaves in a pickling or passivating manner with respect to stainless steel depends mainly on the established redox potential. Acidic solutions having pH values below about 2.5 have a pickling action if, on account of the presence of oxidizing agents, they have a redox potential in the range from about 200 to about 350 mV with respect to a silver/silver chloride electrode. If the redox potential is raised to values above about 300 to 350 mV, depending on the type of the stainless steel, the treatment solution has a passivating effect.

During the pickling of stainless steel, in particular during the pickling of ferritic and martensitic stainless steel, but also during the pickling of austenitic stainless steel containing sulfur in the alloy, a gray black smut is formed during the pickling itself. This is due to the formation of by-products on the surface due to the pickling reaction. In particular ferritic and martensitic grades must be passivated after the pickling using high oxidizing chemical solutions in a separate step. This step provides both the brightening of the material and the passivation of the surface.

A conventional passivating and brightening composition used according to the state of the art is an acidic aqueous solution formed by nitric acid at a concentration ranging from 6% to 20%, which may optionally contain small amounts of hydrofluoric acid (generally from 1 to 10 g/l).

The possible requirement of the presence of HF is due to the fact that some ferritic and martensitic stainless steel grades need a light etching of the surface to allow an efficient bleaching of the surface itself. This means that two different solutions are necessary in practice, one containing HF to solve the problem described above, and another one free of HF, due to the fact that the presence of HF may increase too much the reaction rate on the base alloy, shifting the behavior of the solution from passivation to etching. This would cause high metal dissolution of the base alloy and a further darkening of the surface.

Furthermore, due to the very low HF concentration used, the conventional system is extremely difficult to be controlled and replenished in a proper manner.

In this context, the EP-A-1552035 suggests a passivating solution for stainless steel grades that comprises complex fluoride compounds in order to provide solutions with sufficient bleaching activity but negligible etching impact. The complex fluoride compounds are based on elements of groups 4, 13, or 14 (old notation: groups IVa, III, or IV, i.e. the groups beginning with the elements Ti, B, or C, respectively) of the periodic table of the chemical elements. Furthermore EP-A-1552035 teaches that this type of passivating solution does not necessarily comprise nitric acid so that the detrimental ecological impact in a passivating process of stainless steel can be further minimized. Nevertheless, the solutions according to EP-A-1552035 when applied in order to brighten stainless steel grades that contain high amounts of sulfur as an alloying element often effect metal surfaces with less shiny appearance. Consequently, there exists a need in the prior art to further improve existing passivating and brightening solutions for pickled stainless steel in order to arrive at compositions that are highly efficient with respect to the removal of smut regardless of the specific stainless steel grade to be treated.

The invention is based on the discovery that the presence of organic compounds containing multiple hydroxyl groups with at least 3, but not more than 8 carbon atoms as a further ingredient of passivating and brightening solutions can solve the problem described above.

Accordingly, an acidic aqueous composition for the passivating and brightening of pickled stainless steel surfaces comprises water and the following dissolved components:

(A) at least one acid which is does not contain fluorine;
(B) at least one fluorine containing inorganic compound;
(C) at least one substance containing a peroxy moiety; and
(D) at least one organic compound containing more than two hydroxyl groups with at least 3, but not more than 8 carbon atoms.

With respect to the organic compound (D) those passivating and brightening solutions are preferred wherein at least one hydroxyl group having two vicinal hydroxyl groups does exist within the organic compound (D).

Among the organic compounds (D) being present in a passivating and brightening composition of this invention those compounds having at least one hydroxyl group with two vicinal hydroxyl groups are preferred.

Especially preferred are organic compounds (D) that are selected from reducing sugars and polyols. In an even more preferred composition of this invention the at least one organic compound according to organic component (D) is selected from 1,2,3-trihydroxypropane, 1,2,3,4-tetrahydroxybutane, 1,2,3,4,5-pentahydroxypentane, 1,2,3,4,5,6-hexahydroxyhexane, preferably from sorbitol, xylitol, meso-erythritol and/or glycerol, more preferably from sorbitol, xylitol and/or glycerol. These preferred polyols contained in a composition of this invention are most efficient in desmutting pickled stainless steel surfaces.

In order to achieve optimum desmutting performance during the passivating and brightening process of pickled stainless steel the amount of organic compounds (D) in a composition of this invention is preferably in a range from 2 to 15 g/l, more preferably in a range from 3 to 9 g/l.

The at least one acid according to component (A) of the passivating and brightening aqueous composition preferably has a $pK_a$ value for the first deprotonation step of less than 3.5 and is more preferably selected from sulfuric acid, phosphoric acid and/or citric acid, even more preferably selected from sulfuric acid and/or phosphoric acid.

In order to achieve optimum etching rates of the pickled stainless steel substrates the amount of acids according to compound (A) in a composition of this invention is preferably in a range from 0.5 to 100 g/l, more preferably in a range from 10 to 30 g/l. As an amount of nitric acid in a passivating and brightening composition may give rise to hazardous nitrous fumes, it is preferred that less than 1 g/l, more preferably less than 100 ppm of nitrates are contained. It is a further advantage of this invention that the passivating and brightening action of the composition disclosed herein does not rely on the presence of nitric acid.

According to the present invention, the fluorine containing inorganic compound is preferably selected from free or complex fluorides. In any aspect of the present invention, the complex fluorides can be added as free acids or as salts, preferably alkaline metal salts, which are soluble in the process solution at least in an amount to result in the preferred indicated concentration of component (B). In any case an equilibrium state between the acid and the salt form of the complex fluoride ions will be established, depending on the pH value of the process solution and the dissociation constant of the complex fluoride acid. Preferred free or complex fluorides are based on elements of group 4, group 13 and/or group 14 of the periodic table, more preferably selected from complex fluorides of the elements B, Si, Ti and/or Zr. Special examples are $BF_4^-$, $SiF_6^{2-}$, $TiF_6^{2-}$, and $ZrF_6^{2-}$, either in the form of the corresponding acids or of their salts. For economic and ecological reasons, $SiF_6^{2-}$ is especially preferred.

The preferred amount of compounds according to component (B) of the passivating and brightening composition lies in a range from 4 to 25 g/l, preferably in a range from 8 to 16 g/l calculated as fluorine content.

With respect to the compounds according to component (C) of a passivating and brightening composition according to this invention it is preferred that the substance containing a peroxy moiety is selected from hydrogen peroxide, peroxysulfuric acid, peroxyacetic acid, peroxyboric acid, peroxyphosphoric acid, peroxydiphosphoric acid, and salts thereof.

The preferred amount of compounds according to component (C) of the passivating and brightening composition lies in a range from 3 to 25 g/l, preferably in a range from 5 to 20 g/l calculated as hydrogen peroxide content.

The passivating and brightening composition of this invention may further comprise a component (E) that acts as a stabilizer for the substances contain a peroxy moiety according to compounds of component (C) being otherwise partially decomposed in the presence of metal cations, such as ferric ions released from the steel substrates.

Compounds according to component (E) suitable for this purpose are different from the organic compounds of component (D) and selected from:

(E1) substances constituted of molecules that contain both at least one ether moiety and at least one hydroxyl moiety in each molecule;

(E2) substances constituted of molecules that contain in each molecule at least two ether moieties; and/or (E3) substances constituted of molecules that contain in each molecule both at least one ether moiety and one nitrogen atom that is covalently bonded to at least two, or preferably at least three, carbon atoms.

In a preferred composition of this invention the stabilizers according to component (E) belong to subgroup (E1) and are selected from substances being constituted of molecules having the following characteristics, each preferred characteristic being preferable by itself, independently from the others, and combinations of these preferred characteristics being still more preferable, the overall preference being greater the larger the number of preferred characteristics combined in the molecules:

each molecule has a number of carbon atoms that is at least, with increasing preference in the order given, 3, 4, 5, or 6 and independently preferably is not more than, with increasing preference in the order given, 100, 50, 40, 30, 25, 20, 16, 14, 12, 10, or 8;

each molecule has a number of hydroxyl groups that is not more than, with increasing preference in the order given, 3, 2, or 1; and each molecule has a number of ether moieties that is not more than, with increasing preference in the order given, 50, 40, 30, 25, 20, 15, 10, 8, 6, 4, 3, or 2; and at least one oxygen atom in an ether moiety in each molecule is bonded to a terminal monovalent alkyl group that contains at least 2, or more preferably at least 3, carbon atoms.

Subgroups (E2) and (E3) of stabilizer component (E) are less preferred in passivating and brightening compositions than (E1) primarily for at least one of two reasons: greater expense and/or poorer solubility in brightening and passivating liquids that contain the other required constituents of a brightening and passivating liquid in preferred concentrations according to this invention. Among these two less preferred subgroups, the most preferred are nonionic surfactants with molecules that could be made by ethoxylating fatty alcohols having from 10 to 22 carbon atoms and a single hydroxyl moiety, and then capping the poly(oxyethylene) chain by substituting for the hydrogen atom in the terminal hydroxy moiety an alkyl group or a halo atom. Alkoxylated amines and alkoxylated quaternary ammonium cationic surfactants are next most preferred; these also preferably have at least one, more preferably exactly one, hydrophobic moiety with from 10 to 22 carbon atoms.

The concentration of compounds of component (E) in a brightening and passivating composition according to the invention preferably is at least, with increasing preference in the order given, 0.2, 0.4, 0.6, 0.8, 1.0, 2.0, 3.0, 4.0, or 5.0 g/l and primarily for reasons of economy not more than, with increasing preference in the order given, 75, 50, 40, 30, 20, or 15 g/l.

Finally, the present invention comprises a process for passivating and brightening of pickled surfaces of stainless steel, especially of austenitic, ferritic and/or martensitic steel grades that preferably have a sulfur alloying amount of at least 0.10 at.-% wherein the surfaces are brought into contact (by dip or spray processes) with a composition of this invention described in more detail above. In a dip process the solution is preferably agitated by the injection of air or by mechanical agitation means. The process solution may have a temperature in the range from 15 to 40° C., preferably at most 30° C. The contact time depends on the type of stainless steel and on the kind of pickling treatment prior to the passivating/brightening step. Usual contact times will be in the range from 10 seconds (for strip) to 10 minutes. The contact is terminated by rinsing the stainless steel surface with water, preferably in a power spray process, spraying water with elevated pressure onto the stainless steel surface.

It should be evident from the description above that the process according to the present invention is part of the treatment chain: pretreatment (acid treatment, molten salt treatment, shot peening, mechanical cracking of the scale, and the like), pickling (in one or more steps, e.g. using pickling solutions as quoted in the introductory part), passivating and brightening according to the present invention, water rinse, and drying.

The invention can be applied to the production of stainless steel, especially austenitic, ferritic or martensitic grades, in any form, such as wire, rod, tube, plate, coil, and finished articles. It is possible to use a single process solution, which is a passivating and brightening composition of this invention, for all grades of austenitic, ferritic and martensitic stainless steel containing sulfur (e.g. AISI 303) in order to attain shiny and desmutted steel surfaces.

Compared to the state of the art of nitric acid free passivating and brightening solutions, the composition of this invention effects a homogeneous and bright finishing of pickled stainless steel during the brightening and passivation step in particular for high sulphur ferritic and martensitic grades.

EXAMPLES

Wire samples of hot rolled austenitic stainless steel (EN 1.4029; 0.15-0.25 at.-% of S) and martensitic stainless steel (EN 1.4035; 0.15-0.35 at.-% of S) were pretreated with reduction molten salts and then pickled for 26 minutes at 50° C. in hydrochloric acid (170 g/l HCl) and subsequently for 5 minutes at 40° C. in a Cleanox® solution (commercialized pickling process of the applicant according to EP-B-582 121).

After the rinsing step the wire samples were completely dark due to the presence of black smut on the surface. The wire samples were then immediately brightened and passivated for 5 minutes at 25° C. in different solutions according to Table 1.

After this step the samples were rinsed with low pressure water spray for 1 minute and dried.

The dried wire samples were evaluated visually to compare surface brightness with an arbitrary scale ranging from 1 to 5, where:

1=very bad (as before brightening)

2=bad (surface partially bleached—darkening of white paper when rubbed on the surface)

3=acceptable (quite bleached surface but still some residuals after white paper rubbing)

4=good (negligible black residuals rubbing paper on the surface, but poor homogeneity)

5=very good (completely bleached and homogeneous surface—no black residuals rubbing the surface with paper).

TABLE 1

Results of the brightening of wire samples of different stainless steel grades

| Example | Composition | Concentration g/l | Brightness EN 1.4029 | Brightness EN 1.4035 |
|---|---|---|---|---|
| C1 | $HNO_3$ | 630 | 2 | 2 |
| C2 | $H_2SO_4/H_2O_2/HF$ | 15/17/2 | 1 | 1 |
| C3 | $H_2SO_4/H_2O_2/HF$ | 15/17/10 | 1 | 1 |
| C4 | $H_2SO_4/H_2O_2/H_2SiF_6$ | 15/17/7 | 3 | 3 |
| C5 | $H_2SO_4/H_2O_2/H_2SiF_6$ | 15/17/14 | 3 | 3 |
| E1 | $H_2SO_4/H_2O_2/H_2SiF_6$/ glycerol | 15/17/14/3.5 | 5 | 5 |
| E2 | $H_2SO_4/H_2O_2/H_2SiF_6$/ sorbitol | 15/17/14/6.9 | 5 | 5 |
| E3 | $H_2SO_4/H_2O_2/H_2SiF_6$/ glycerol/sorbitol | 5/17/14/2/2 | 5 | 5 |
| E4 | $H_2SO_4/H_2O_2/H_2SiF_6$/ xylitol | 15/17/14/5.8 | 5 | 5 |

Wire samples of a less noble austenitic grade, such as the sulphur containing alloy EN 1.4305 were pickled for 40 minutes at 40° C. in a Cleanox® solution (commercialized pickling process of the applicant according to EP-B-582 121).

After the rinsing step the wire samples were completely dark due to the presence of black smut on the surface. The samples were then immediately passivated and brightened for 5 minutes at 25° C. in different solutions according to Table 2.

After this step the wire samples were rinsed with low pressure water spray for 1 minute and dried. The same arbitrary scale for the assessment of the surface brightness as described above was applied to the dried wire samples of the alloy EN 1.4305.

The effect of the compositions of this invention on the desmutting performance on EN 14305 stainless steel is less pronounced compared to the stainless steel grades of Table. 1. Nevertheless compositions of the invention prove to perform slightly better.

TABLE 2

Results of the brightening of wire samples of EN 1.4305 austenitic stainless steel with a sulfur content of 0.15 at.-%

| Example | Composition | Concentration g/l | Brightness |
|---|---|---|---|
| C6 | $HNO_3$ | 150 | 4 |
| C7 | $H_2SO_4/H_2O_2/H_2SiF_6$ | 15/17/7 | 4 |
| C8 | $H_2SO_4/H_2O_2/H_2SiF_6$ | 15/17/14 | 4 |
| E5 | $H_2SO_4/H_2O_2/H_2SiF_6$/ meso-erythritol | 15/17/14/3.5 | 4 |
| E6 | $H_2SO_4/H_2O_2/H_2SiF_6$/ xylitol | 15/17/14/3.5 | 5 |
| E7 | $H_2SO_4/H_2O_2/H_2SiF_6$/ sorbitol | 15/17/14/3.5 | 5 |
| E8 | $H_2SO_4/H_2O_2/H_2SiF_6$/ sobitol/glycerol | 15/17/14/3.5 | 5 |
| E9 | $H_2SO_4/H_2O_2/H_2SiF_6$/ glycerol | 15/17/14/3.5 | 5 |

The effect of the concentration of different glycols (polyol according to "Description of the invention") was investigated on hot rolled EN 1.4029 following the same sequence of treatment as described for the examples of Table 1 and applying the same arbitrary scale for the evaluation of surface brightness.

TABLE 3

Effect of the concentration of different polyols on the brightening of hot rolled austenitic stainless steel wire samples (EN 1.4029) with a sulfur content of 0.15-0.25 at.-%

| Example | Composition | Concentration g/l | Brightness |
|---|---|---|---|
| E10 | $H_2SO_4/H_2O_2/H_2SiF_6$/ glycerol | 15/17/14/3 | 5 |
| E11 | $H_2SO_4/H_2O_2/H_2SiF_6$/ glycerol | 15/17/14/6 | 5 |
| E12 | $H_2SO_4/H_2O_2/H_2SiF_6$/ glycerol | 15/17/14/9 | 5 |
| E13 | $H_2SO_4/H_2O_2/H_2SiF_6$/ sorbitol | 15/17/14/3 | 5 |
| E14 | $H_2SO_4/H_2O_2/H_2SiF_6$/ sorbitol | 15/17/14/6 | 5 |
| E15 | $H_2SO_4/H_2O_2/H_2SiF_6$/ sorbitol | 15/17/14/9 | 5 |
| E16 | $H_2SO_4/H_2O_2/H_2SiF_6$/ xylitol | 15/17/14/5 | 5 |
| E17 | $H_2SO_4/H_2O2/H_2SiF_6$/ xylitol | 15/17/14/9 | 5 |

The brightening result conferred by compositions of this invention for the most preferred compounds (D) is very stable in a concentration range from 3-9 g/l (Table 3).

The effect of the concentration of different oxidizing agents (according to "Description of the invention") was investigated on wire samples of hot rolled martensitic stainless steel EN 1.4035 following the same sequence of treatment as described for the examples of Table 1 and applying the same arbitrary scale for the evaluation of surface brightness.

TABLE 4

Effect of different oxidizing agents on the brightening of hot rolled martensitic stainless steel wire samples (EN 1.4035) with a sulfur content of 0.15-0.35 at.-%

| Example | Composition | Concentration g/l | Brightness |
|---|---|---|---|
| C9 | $H_2SiF_6/HNO_3$ | 14/50 | 1 |
| E18 | $H_2SiF_6/HNO_3$/glycerol | 14/50/3.5 | 4 |
| E19 | $H_2SO_4H_2O_2/H_2SiF_6/HNO_3$/ glycerol | 15/17/14/50/3.5 | 4 |
| E20 | $H_2SO_4/H_2O_2/H_2SiF_6$/glycerol | 15/3/14/3.5 | 4 |
| E21 | $H_2SO_4/H_2O_2/H_2SiF_6$/glycerol | 15/6/14/3.5 | 4 |
| E22 | $H_2SO_4/H_2O_2/H_2SiF_6$/glycerol | 15/9/14/3.5 | 5 |
| E23 | $H_2SO_4/H_2O_2/H_2SiF_6$/glycerol | 15/17/14/3.5 | 5 |

The use of nitric acid as a strong acid according to component (A) of a composition of this invention yields slightly poorer results with respect to the brightness of the treated stainless steel surfaces (E18, E19). Similarly, the brightening effect in compositions of this invention where the amount of compounds with a peroxy moiety according to component (C) does vary in a range from 3-17 g/l is considerably stable in this specific range (E20-E23).

What is claimed is:

1. A passivating and brightening aqueous composition, comprising water and the following dissolved components:

(A) at least one acid which does not contain fluorine;

(B) at least one fluorine containing inorganic compound;

(C) at least one substance containing a peroxy moiety; and (D) at least one organic polyol compound containing more than two hydroxyl groups with at least 3, but not more than 8 carbon atoms.

2. The composition of claim 1, wherein the at least one acid which does not contain fluorine according to component (A) is selected from the group consisting of sulfuric acid, phosphoric acid, and combinations thereof.

3. The composition according to claim 1 wherein the at least one organic compound according to component (D) is selected from 1,2,3-trihydroxypropane, 1,2,3,4-tetrahydroxybutane, 1,2,3,4,5-pentahydroxypentane, 1,2,3,4,5,6-hexahydroxyhexane.

4. The composition according to claim 1 wherein the at least one organic compound according to component (D) is present in a range from 2 to 15 g/l.

5. The composition according to claim 1 wherein the at least one acid according to component (A) has a $pK_a$ value for a first deprotonation step of less than 3.5.

6. The composition according to claim 1 wherein the at least one acid according to component (A) is present in a range from 0.5 to 100 g/l.

7. The composition according to claim 1 wherein the at least one fluorine containing inorganic compound according to component (B) is selected from free or complex fluorides.

8. The composition according to claim 1 wherein the at least one fluorine containing inorganic compound according to component (B) is present in a range from 4 to 25 g/l, calculated as fluorine content.

9. The composition according claim 1 wherein the at least one substance containing a peroxy moiety according to component (C) is selected from hydrogen peroxide, peroxysulfuric acid, peroxyacetic acid, peroxyboric acid, peroxyphosphoric acid, peroxydiphosphoric acid, and salts thereof.

10. The composition according to claim 1 wherein the at least one substance containing a peroxy moiety according to component (C) is present in a range from 3 to 25 g/l, calculated as hydrogen peroxide content.

11. The composition according to claim 1 further comprising at least one organic compound as component (E), which is different from compound (D) and selected from:
- (E1) substances constituted of molecules that contain both at least one ether moiety and at least one hydroxyl moiety in each molecule;
- (E2) substances constituted of molecules that contain in each molecule at least two ether moieties; and/or
- (E3) substances constituted of molecules that contain in each molecule both at least one ether moiety and one nitrogen atom that is covalently bonded to at least three carbon atoms.

12. The composition according to claim 11 wherein the at least one organic compound (E) is present as component (E1) that is selected from compounds wherein
- each molecule has a number of carbon atoms that is at least 3 and is not more than 100; and
- each molecule has a number of hydroxyl groups that is not more than 3; and
- each molecule has a number of ether moieties that is not more than 50; and
- at least one oxygen atom in an ether moiety in each molecule is bonded to a terminal monovalent alkyl group that contains at least 2 carbon atoms.

13. The composition according to claim 1 wherein:
- (A) is present as sulfuric acid in an amount of 0.5 to 100 g/l;
- (B) is present as a complex fluoride of B, Si, Ti and/or Zr in a range from 4 to 25 g/l, calculated as fluorine content;
- (C) is present in a range from 3 to 25 g/l, calculated as hydrogen peroxide content;
- (D) is present as one or more of sorbitol, xylitol, meso-erythritol, glycerol in a range from 2 to 15 g/l; and
- said composition containing less than 1 g/l of nitrates.

14. The composition according to claim 1, wherein the at least one organic compound according to component (D) is selected from sorbitol, xylitol, meso-erythritol, glycerol and mixtures thereof.

15. The composition according to claim 1 wherein the at least one fluorine containing inorganic compound according to component (B) is selected from complex fluorides of B, Si, and/or Ti.

16. A passivating and brightening aqueous composition for use on stainless steel, comprising water and the following dissolved components:
- (A) at least one acid which does not contain fluorine, the at least one acid being present in an amount of 10 to 30 g/l;
- (B) at least one fluorine containing inorganic compound;
- (C) at least one substance containing a peroxy moiety; and
- (D) at least one organic polyol compound containing more than two hydroxyl groups with at least 3, but not more than 8 carbon atoms present in an amount sufficient for removal of smut from stainless steel.

17. The passivating and brightening aqueous composition for use on stainless steel of claim 16, further comprising component (E) a stabilizer different from component (D) comprising substances constituted of molecules that each contain 3-100 carbon atoms, 1-50 ether moieties, and 1-3 hydroxyl moieties;
- wherein at least one oxygen atom in one of the ether moieties in each molecule is bonded to a terminal monovalent alkyl group that contains at least 2 carbon atoms.

18. A process for the brightening and passivating of austenitic, ferritic or martensitic stainless steel grades wherein the stainless steel grade is subsequently after pickling with or without intermediate rinsing step brought into contact with a brightening and passivating composition according to claim 1 for a time and at a temperature sufficient for desmutting the pickled stainless steel grade; wherein temperature is in a range from 15 to 40° C.

* * * * *